Feb. 17, 1948.   A. H. REIBER   2,436,229
RECORDER
Filed July 29, 1943   7 Sheets-Sheet 1
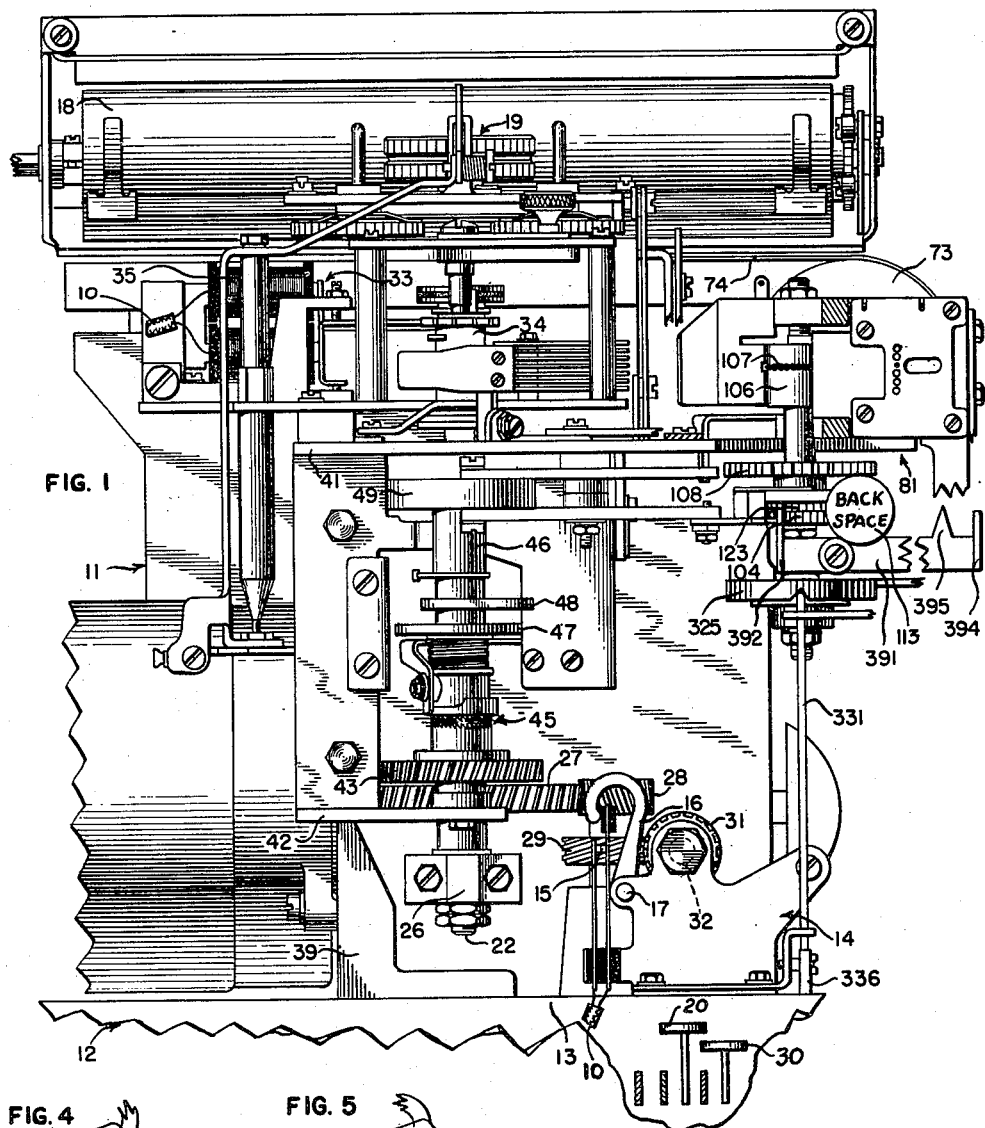
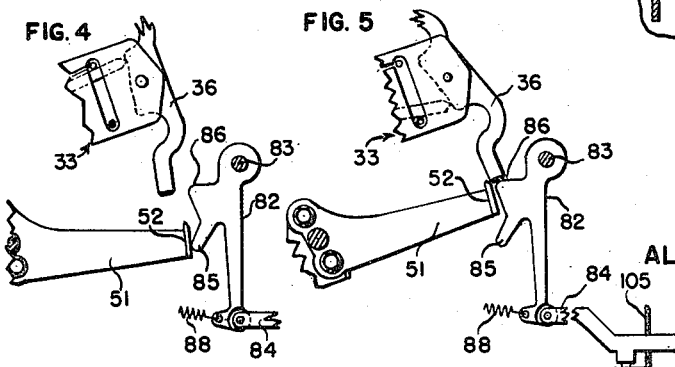
INVENTOR
ALBERT H. REIBER, DECEASED
EMILY Y. REIBER, EXECUTRIX
BY
H.B. Whitfield
ATTORNEY Feb. 17, 1948.  A. H. REIBER  2,436,229
RECORDER
Filed July 29, 1943  7 Sheets-Sheet 2
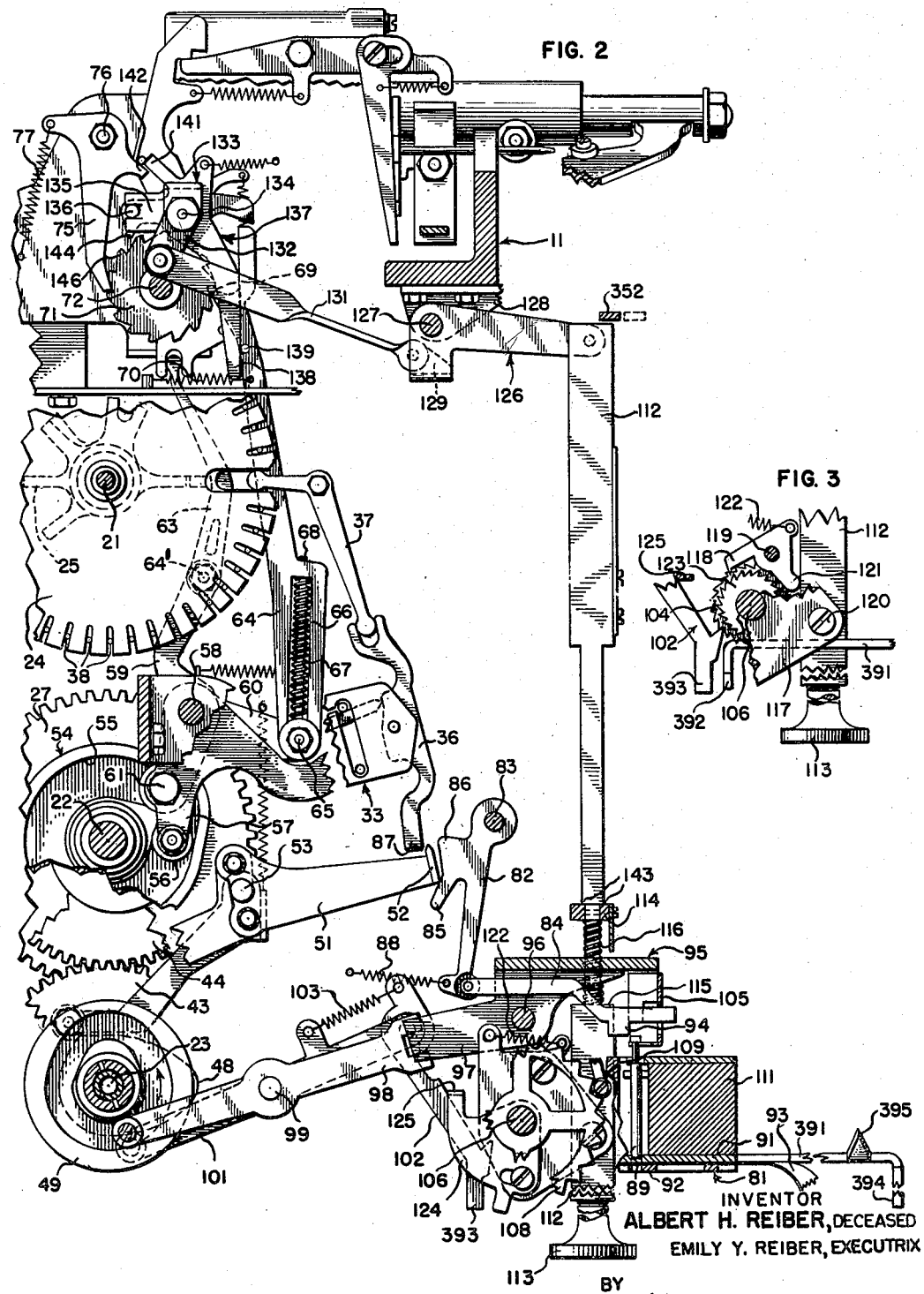

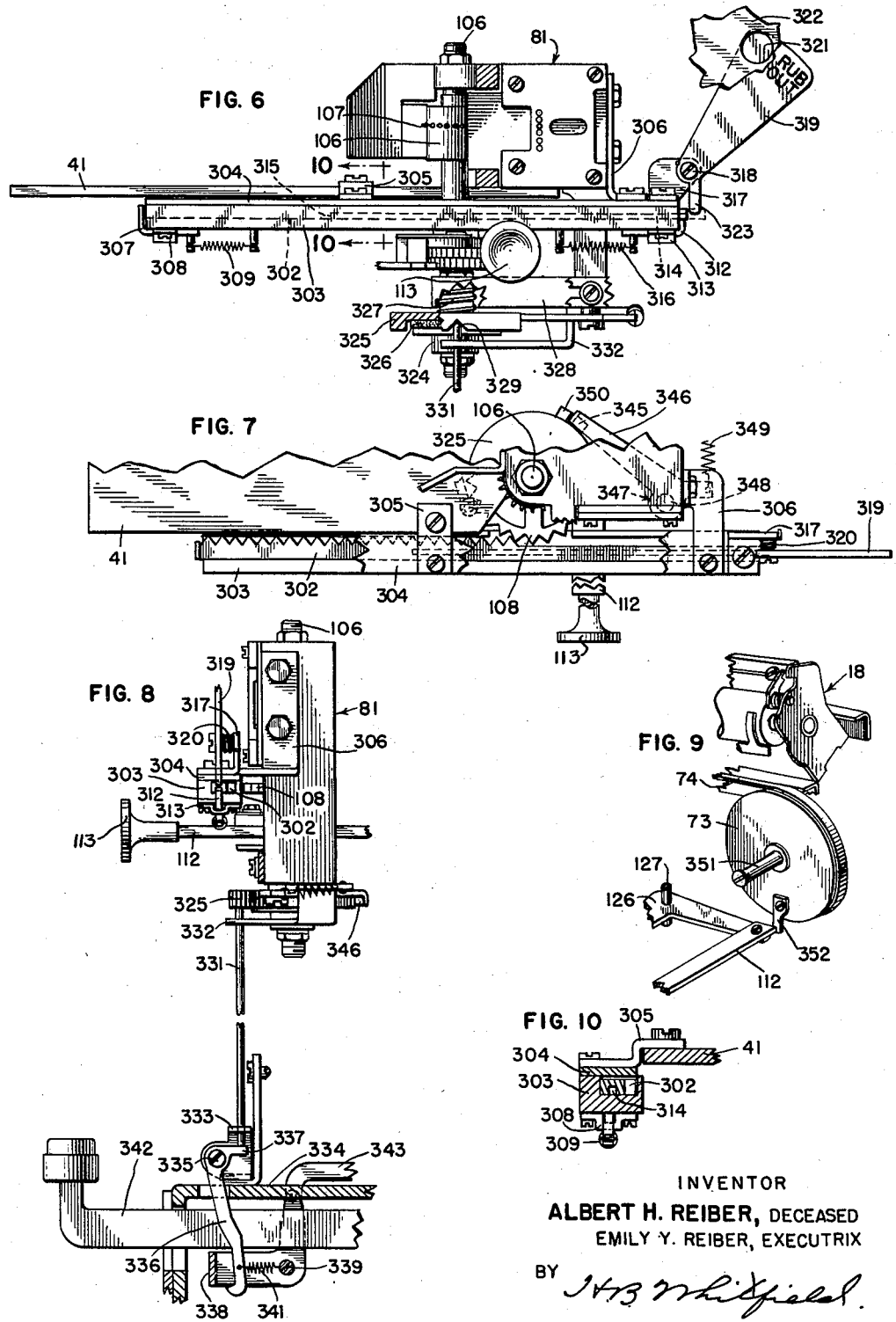

Feb. 17, 1948. A. H. REIBER 2,436,229
RECORDER
Filed July 29, 1943 7 Sheets-Sheet 4
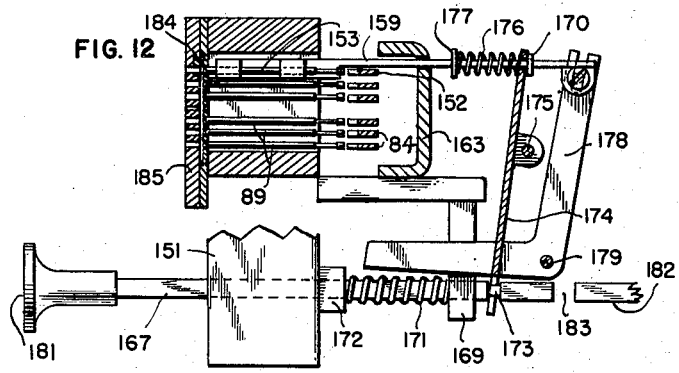
FIG. 12
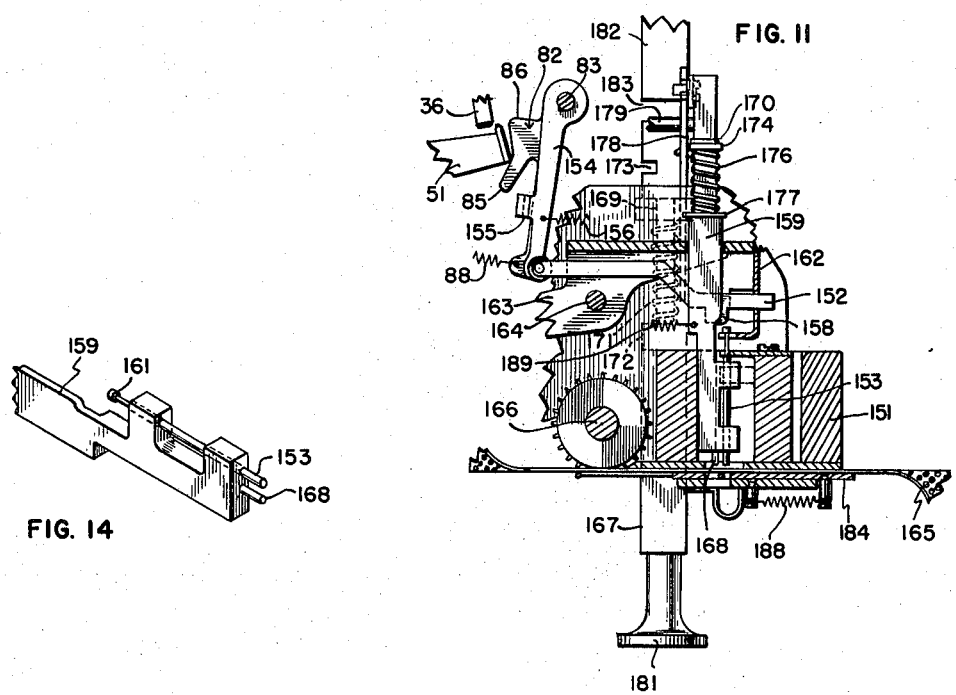
FIG. 11
FIG. 14
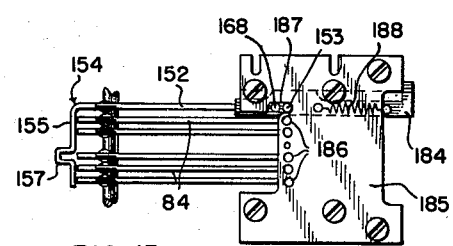
FIG. 13
INVENTOR
ALBERT H. REIBER, DECEASED
EMILY Y. REIBER, EXECUTRIX
BY
ATTORNEY Feb. 17, 1948.  A. H. REIBER  2,436,229
RECORDER
Filed July 29, 1943  7 Sheets-Sheet 5
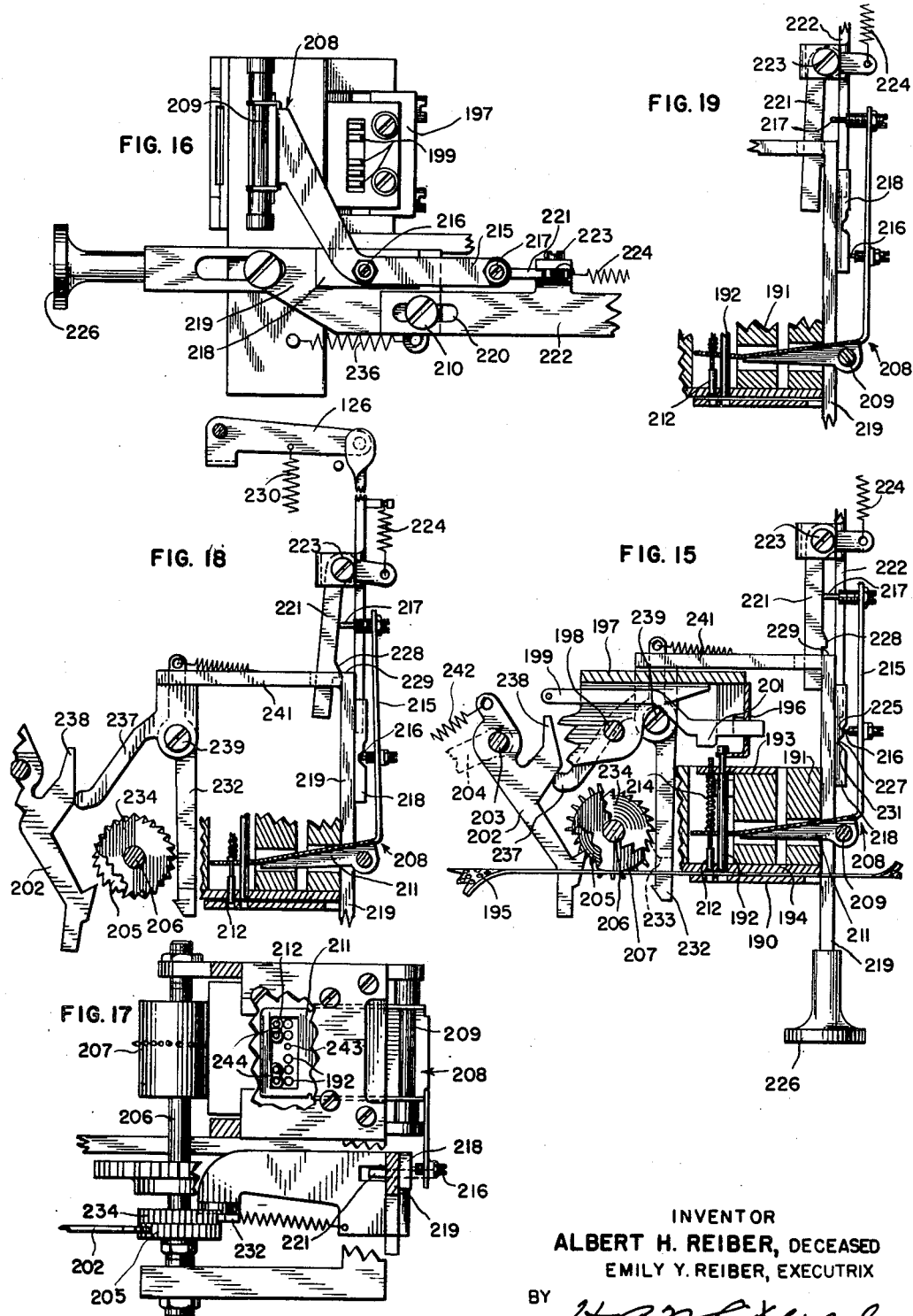
INVENTOR
ALBERT H. REIBER, DECEASED
EMILY Y. REIBER, EXECUTRIX
BY
ATTORNEY Feb. 17, 1948.    A. H. REIBER    2,436,229
RECORDER
Filed July 29, 1943    7 Sheets-Sheet 6
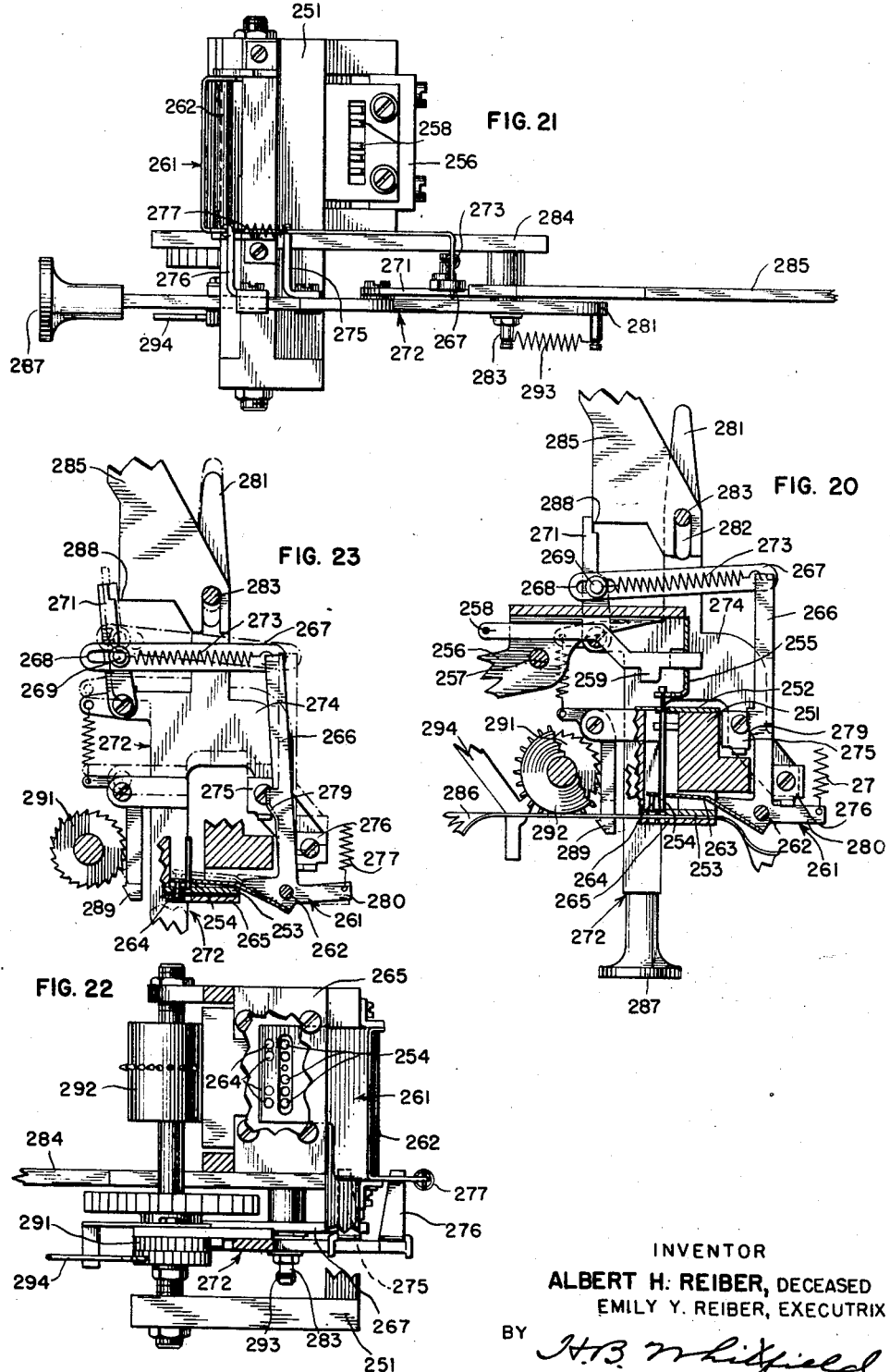
INVENTOR
ALBERT H. REIBER, DECEASED
EMILY Y. REIBER, EXECUTRIX
BY
ATTORNEY Feb. 17, 1948. A. H. REIBER 2,436,229
RECORDER
Filed July 29, 1943 7 Sheets-Sheet 7
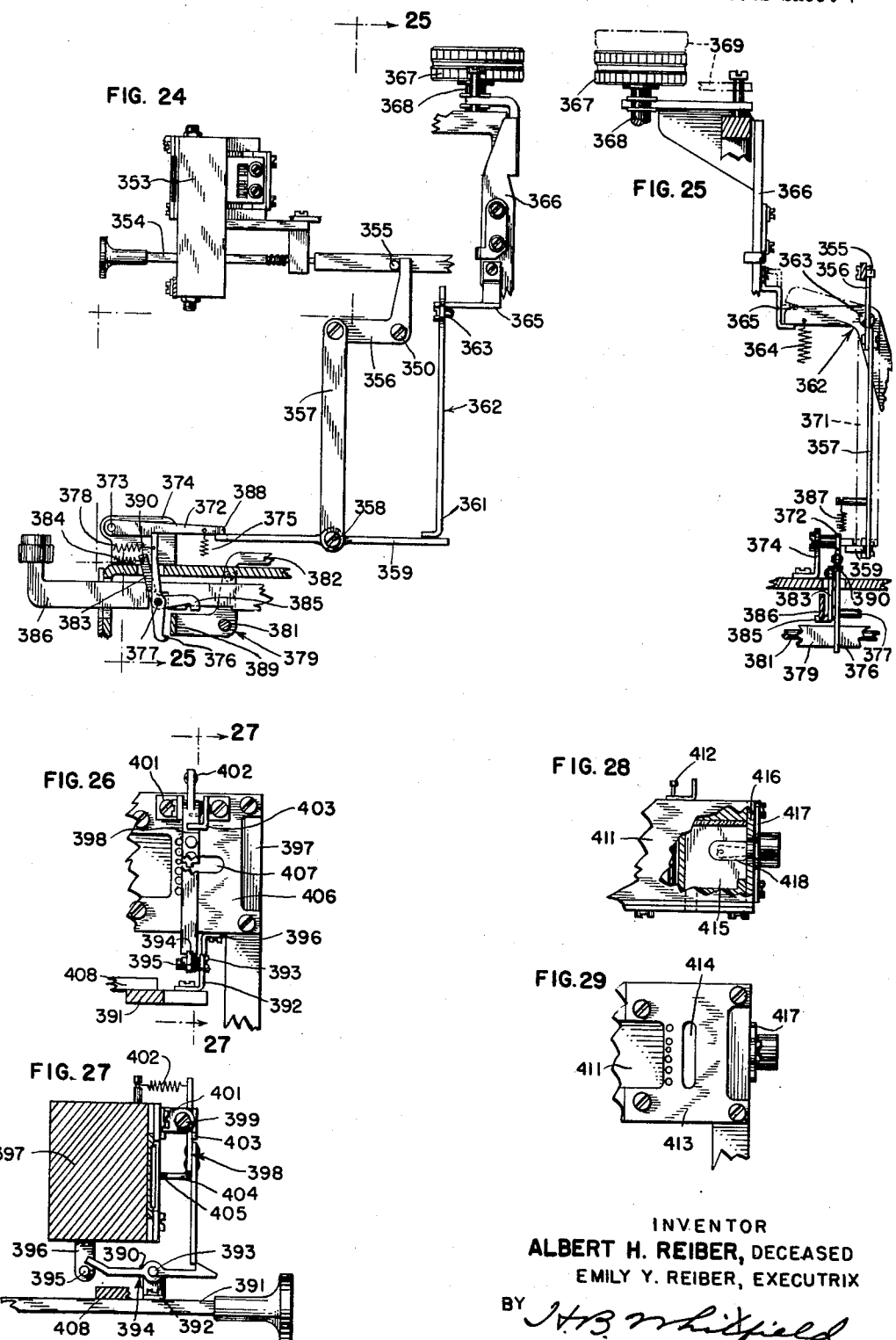
INVENTOR
ALBERT H. REIBER, DECEASED
EMILY Y. REIBER, EXECUTRIX
BY
ATTORNEY Patented Feb. 17, 1948

2,436,229

UNITED STATES PATENT OFFICE 2,436,229

RECORDER

Albert H. Reiber, deceased, late of Evanston, Ill., by Emily Y. Reiber, executrix, Evanston, Ill., assignor to Teletype Corporation, Chicago, Ill., a corporation of Delaware Application July 29, 1943, Serial No. 496,551

12 Claims. (Cl. 164—113)

This invention relates to recording apparatus and more particularly to combination printing and perforating apparatus for the substantially simultaneous preparation of a printed record and a perforated record. This device is an initiating recorder by printing-and-punching, using a textual-error correcting means for both records, the whole device being at a sending station. However, the printing-and-punching means only can be used in a receiver at a remote station, some transmitting set of contacts being used at the sending station.

The principal object of the invention is the provision of means for effecting corresponding correction of the textual errors in the records made on a plurality of different recording mediums.

Another object of the invention is to provide devices in a combination printing and perforating apparatus for enhancing the effectiveness and utility of such apparatus.

Specifically, the present invention concerns the provision of certain accessories in the apparatus shown in U. S. Patent No. 2,247,408, issued July 1, 1941, to A. H. Reiber as modified by Reiber 2,296,874. The device according to the present invention has many parts similar to the parts in said patents, but the instant device is at the sending station and is operated by its own keyboard which by means of a short cable controls the sending of code impulses to its selector magnet. Said patents disclose a page printer, but the apparatus according to the present invention contemplates the addition thereto of a tape perforating device which is connected to and controlled by the selector mechanism of said page printer, so that substantially simultaneous records are made on the page material and on the tape. In such combination printing and perforating devices, it is desirable to provide means for correcting the page record and the tape perforated record substantially simultaneously, the latter a little before the former. In performing this operation the tape record is back spaced and after back spacing a sufficient number of characters representing the to-be-corrected material, the tape is again forward spaced, and the back spaced characters are then cancelled by perforating thereover a rubout signal. To make the record on the page agree with the perforated record, the present invention provides means for substantially simultaneously back spacing the printed record in correspondence with the back spacing operation of the perforated tape. Then, when this operation is performed, the record on the page corresponding to the deleted record on the tape is cancelled by printing thereover a cancellation character.

Another feature of the present invention consists in providing means, effective under certain predetermined conditions, to suppress the back spacing of the printed copy when the tape is being back spaced, for the reason that when the "letters" or "figures" shift signals are perforated in the tape the platen remains quiescent, and therefore when the tape is to be back spaced it is not necessary to back space the platen when the tape is back spaced through the shift code combinations perforated therein.

A further feature of the present invention resides in the provision of means for indicating when the tape is in its back spaced position, and of locking mechanism to lock the key levers against operation while the tape is being back spaced, said locking mechanism remaining effective until all the back spaced characters have been rubbed out.

A more complete understanding of the present invention may be had from the following description when taken in conjunction with the accompanying drawings wherein like reference numerals are used to designate similar parts throughout and wherein:

Fig. 1 is a front elevational view of the printer shown in the above-mentioned Reiber patent, modified according to the present invention;

Fig. 2 is a partial sectional plan view of the printer shown in Fig. 1 disclosing the present invention;

Fig. 3 is a partial sectional view of the punch block to show operation of the pawls of the back spacing mechanism for the punched tape;

Fig. 4 is a view showing one of the effective positions of the selector members;

Fig. 5 is a view showing a second effective position of the selector members;

Fig. 6 is a front elevational view of the back space indicator and key board lock actuating mechanism of the present invention;

Fig. 7 is a plan view of the mechanism shown in Fig. 6;

Fig. 8 is a side elevational view, partly in section, of the mechanism shown in Figs. 6 and 7;

Fig. 9 is a fragmentary perspective view of mechanism to suppress the back spacing operation when the platen is in its beginning-of-line position;

Fig. 10 is a sectional view taken on line 10—10 of Fig. 6;

Fig. 11 is a sectional plan view of a modification of the perforating device whereby the back spacing of the platen of the page printer is suppressed under certain operating conditions;

Fig. 12 is a side elevational view of the modification shown in Fig. 11;

Fig. 13 is a front elevational view of the modification shown in Fig. 11;

Fig. 14 is a perspective view of the sixth punch and sensing pin employed in the modification shown in Fig. 11;

Fig. 15 is a sectional plan view of another modification of the invention for suppressing the back spacing of the platen while the tape is back spaced;

Fig. 16 is a side elevational view of the modification shown in Fig. 15;

Fig. 17 is a front elevational view of the modification shown in Fig. 15;

Fig. 18 is a sectional plan view of the modification shown in Fig. 15, illustrating the sensing mechanism in one of its operating positions;

Fig. 19 is a sectional plan view of the modification shown in Fig. 15, showing a second operating position of the sensing mechanism;

Fig. 20 is a fragmentary plan view of a further modification of the invention for suppressing the back spacing of the platen when the tape is back spaced;

Fig. 21 is a side elevational view of the modification shown in Fig. 20;

Fig. 22 is a front elevational view of the modification shown in Fig. 20;

Fig. 23 is a sectional plan view of the modification shown in Fig. 20 illustrating the sensing mechanism in one of its operated positions;

Fig. 24 is a fragmentary side elevational view of the apparatus according to the present invention showing a keyboard locking device controlled by the back spacing mechanism;

Fig. 25 is a sectional view taken on line 25—25 of Fig. 24;

Fig. 26 is a front elevational view of the punch block showing an arrangement for marking the tape during the back spacing operation;

Fig. 27 is a sectional view taken substantially on line 27—27 of Fig. 26;

Fig. 28 is a sectional plan view of the punch block showing as another modification a luminous indicator associated therewith, and Fig. 29 is a front elevational view of the device shown in Fig. 28.

Having reference to Fig. 1 of the drawings, the numerals 11 and 12 denote generally the typing unit and the keyboard transmitting unit, respectively, of the printing telegraph apparatus shown in the afore-mentioned Patent No. 2,247,408. The keyboard apparatus comprises a base portion 13 on which is mounted the transmitting contact assembly 14, which comprises a plurality of transmitting contact springs 15 controlled by a corresponding plurality of gooseneck levers 16 pivoted at 17 which are controlled sequentially by a series of cams, as disclosed in Reiber Patent No. 2,296,874. Contacts 15 are electrically connected by cable 10 to selector magnet 35.

The typing or printing unit 11 comprises a platen 18 which is moved in a rightward and leftward direction (as viewed in Fig. 1) with respect to a type wheel 19. The normal position of type wheel 19 is below the printing line or level, and during the printing operation it is elevated so as to bring the character elements located upon the periphery thereof into position to effect printing in a line upon a page associated with the cylindrical platen 18. Having reference to Fig. 2, the printing mechanism 11 comprises three vertical shafts 21, 22, and 23, which are suitably journaled in the printing apparatus. Shaft 21 supports a code disc selector mechanism 24 for determining the printing position of the type wheel, the function controlling abutment pins 25, as well as the type wheel 19. The shaft 22 carries various cams among which are the printing cam and the spacing cam.

Just above the point at which shaft 22 enters the lower bearing block 26, said shaft has secured thereto a gear 27. An electric motor (not shown) drives a pinion which meshes with gear 27 so that the shaft 22 to which the gear 27 is secured, is continuously rotated. It may be added at this point that a gear 28 (Fig. 1) carried by a stub shaft meshes with gear 27, and that a spiral gear 29 also secured to the stub shaft meshes with a gear 31 carried by the transmitter shaft 32. Thus rotation is imparted to the transmitting distributor shaft 32 from the motor pinion through gears 27, 28, 29, and 31.

The sword and T-lever mechanism indicated generally as 33 is actuated under the joint control of selector cam assembly 34 and the selector magnet 35 (Fig. 1) to interpret or integrate a series of impulses representing a signal combination preparatory to setting T-levers 36 in accordance with the signal combination. Each of the T-levers 36 engages one arm of a transfer bell crank 37, individual thereto, the other arm of which is articulated to one of the notched code discs of the code disc selector mechanism 24.

The code disc selector mechanism 24 has a circular arrangement of vertically positioned stop pins 38 which project through slots in the topmost plate of the mechanism. Stop pins 38 are biased inwardly radially of the code disc selector mechanism and near their upper ends they rest against the edges of the shiftable notched code discs as is fully described in the Reiber Patent No. 2,296,874. The notching of the code discs is such that for any permutative setting of the discs under the control of T-levers 36 one only of the stop pins 38 finds presented to it an alignment of notches, whereupon the pin 38 enters the alignment of notches under the influence of its biasing spring, its upper end moving inwardly. A type wheel stop arm (not shown) fixed to the type wheel shaft 21 is of such length that in revolving it just clears those of the stop pins 38 that are held in their outermost positions by the code discs, but finds blocking its path any pin 38 which has entered an alignment of notches in the periphery of the code discs. The type wheel shaft 21 extends downwardly through the code disc selector mechanism 24 coaxially thereof and receives a continuous torque from the driving motor through any convenient means, such as a gear carried by the shaft 21 and connected thereto by friction discs, the gear being continuously in mesh with the motor pinion. With this arrangement, the shaft 21 is always prepared to rotate and is free to do so when any stop pin 38 which has been previously selected is moved out of the path of the stop arm upon the resetting of the code discs. With this arrangement, shaft 21 may be arrested in any angular position in which the stop arm encounters a stop pin 38.

The front portion 39 (Fig. 1) of the primary foundation casting of the typing unit 11 has secured thereto spaced brackets 41 and 42. The shaft 23 is rotatably supported in vertical position between brackets 41 and 42. Shaft 23 has secured thereto near the lower end a gear 43 which permanently meshes with a gear 44 supported by gear 27 as secured thereto by any desired means, such as screws. Gear 43 is cooperatively related with a positive engagement clutch mechanism, indicated generally as 45 (Fig. 1), which governs the rotation of a cam sleeve 46.

The cam sleeve 46 supports the transfer cam 48, the type wheel shift cam 47 and a double grooved face cam 49 which controls the operation of the perforating mechanism. The direction of rotation of cam sleeve 46 is counterclockwise, and cam 48, in being rotated, imparts clockwise rotation to the cam follower lever 51 and its locking extension 52. The follower lever 51 is mounted on a pivot shaft 53 suitably carried in the printer structure.

Mounted on shaft 22 is a channel or box cam 54, the cam groove 55 of which receives the follower roller 56 rotatably mounted on a bell crank lever 57 rockably mounted on the pivot shaft 58. A lever 59 is also rockably mounted upon the shaft 58 and is secured at its forward end to the cam operated bell crank lever 57 by a clamping bolt 61 which passes through a slot (not shown) in the bell crank lever 57. Said slot provides adjustability in the clamping together of the levers 59 and 57. The lever 59 is effective in the conditioning of functions when they are selected. As described in U. S. Patent No. 2,296,874 the selection of functions is controlled in accordance with certain stop positions of the type wheel, and the lever 59 is provided for effecting response of the functioning conditioning or performing mechanisms. Such means has been provided on the type wheel shaft 21 and comprises a plurality of index pins or abutment pins 25 disclosed in various horizontal planes and in various radial positions with respect to the type wheel. For cooperation with the index pins 25 there are provided a plurality of superposed levers 63 pivotally mounted on a pivot pin 64' carried at the rearmost end of lever 59.

A spacing pawl 64 is articulated to the pin 65 carried in the end of a bell crank lever 60 through a spring yield connection comprising slot 66, spring 67 and a guide pin 68. The pivot pin 65 enters the slot 66 and is urged to the forward end of the slot by the compression spring 67. The pin 65 is retained in the slot inside the convolutions of the spring 67 and prevents the spring from escaping from the slot. The normal movement of the pawl 64 is reciprocatory due to the rocking of the bell crank lever 60 about a cam (not shown), but if the movement of the pawl 64 is blocked as it may be under certain circumstances, the pin 65 may move within the slot and the spring 67 will take up the movement imparted by the cam and will restore the pin 65 to the forward end of the slot 66 when the follower roller 56 has escaped from the highest portion of cam 54. The pawl 64 has at its opposite end a ratchet engaging prong 69 which engages a spacing ratchet 71 to impart counterclockwise rotation thereto as the pawl 64 is reciprocated. The pawl 64 is spring biased into contact with the ratchet 71 by a spring 70. The ratchet wheel 71 is fixed to a rotatable carriage spacing shaft 72 which carries at its upper end a pinion (not shown) which meshes with a rack connected to the platen carriage 18. A step-by-step movement of the carriage 18 for letter spacing is effected by counterclockwise rotation of the spacing ratchet 71 responding to the reciprocation of the spacing pawl 64. Now, as the carriage 18 is stepped for letter spacing, it tensions the carriage return spring for a carriage return operation. A retaining pawl 75 pivotally mounted at 76 and urged in a counterclockwise direction by a spring 77 engages one after another of the teeth of the ratchet 71 and retains the ratchet and thus the platen carriage in the successive positions to which they are advanced by the pawl 64.

According to the present invention the T-levers 36 of the selector mechanism 33 are arranged to control also the selective operation of a perforating mechanism provided for the purpose of producing a perforated record on a tape corresponding to the printed record made on the page. To achieve this result a perforating device is provided at the forward upper right-hand portion of the typing unit 11, as indicated in Fig. 1. This perforating device is indicated generally by the numeric 81.

The locking extension 52 cooperates with a plurality of levers 82 pivoted on 83 to control the selective positionment of a corresponding plurality of interponents 84, each interponent 84 being pivotally articulated to the lever 82. As the cam follower 51 is rotated clockwise by its cam 48, its locking extension 52 acts upon projections 85 individual to levers 82 to rotate the levers 82 counterclockwise a predetermined angular amount sufficient to bring the shoulder 86 of the levers 82 out of the arcuate path of the extremities 87 of the T-levers 36, so that when the T-levers 36 are rocked counterclockwise during the selective positionment thereof, the extremity 87 is rotated into the path of the shoulder 86. When the locking extension 52 is again rocked or rotated counterclockwise to the position shown in Fig. 2, the shoulders 86 of certain ones of the levers 82 will be blocked by the extremities 87 of certain levers 36, and thus levers 82 are prevented from rotating in a clockwise direction under the influence of individual springs 88, while others of the levers 82 which are not blocked by the T-levers 36 will be rotated back to their clockwise position by their springs 88, as indicated in Fig. 2. As indicated in Figs. 2, 4, and 5, various selective positions of the levers 82 and interponents 84 are illustrated.

The perforator 81 comprises a set of punches 89 movable through a guide plate 91 and coacting with a die plate 92 to perforate a tape 93. The interponents 84 are provided with projections 94, so that when an interponent 84 is selected and moved rightwardly, as viewed in Fig. 2, the projection 94 will align with the punch 89 to cause it to perforate the tape when the punch hammer 95 is rocked about the pivot 96. The punch hammer 95 is provided with an arm 97 which is pivotally articulated to one arm of a punch operating lever 98, the other arm of which is provided with a cam follower roller which cooperates with a cam groove in cam 49. Lever 98 is pivotally mounted on a pivot shaft 99 to which is also pivotally carried a lever 101. To the end of one arm of lever 101 is mounted a follower roller which cooperates with a cam groove in the box cam 49, and at the other end of the other arm of lever 101 is pivotally mounted a pawl member 102 which is normally biased counterclockwise by a spring 103 into cooperative engagement with a tape feed ratchet 104 (Fig. 3). For each cycle of rotation of cam 49, the levers 98 and 101 are rocked through a single reciprocatory movement to effect corresponding movements of the punch hammer 95 and pawl 102, respectively. The hammer 95 is provided with a portion 105 which guides the extremities of the interponents 84, and also imparts the operating movement thereto which causes the punches 89 to perforate the tape 93 if a projection 94 registers with a punch 89. The punches 89 are also shouldered to cooperate with the inwardly directed portion of the member 105 to provide a means for stripping or withdrawing the punches 89 from the tape 93. When the punch hammer 95 is operated to perform a punching operation, the pawl 102 is moved forwardly (as viewed in Fig. 2) to engage a tooth on the ratchet 104 and when the punch hammer and pawl are moved in the opposite direction the pawl 102 will engage the ratchet tooth and rotate the ratchet 104 one angular step corresponding to a character spacing movement of the tape.

The ratchet 104 is integrally associated with the feed roll shaft 106 which carries thereon (as viewed in Fig. 1) a peripheral series of feed pins 107. Carried on the feed roll shaft 106 is a detent star wheel 108 with which is associated a detent jockey 109.

The present invention also provides an arrangement for back spacing the tape 93 which is at the same time effective to impart reverse movement to the platen 18 corresponding to the back spacing movement of the tape. Carried in the punch block 111 is a back space bar 112 having at its forward end a finger piece 113. The bar 112 is also supported behind the punch block in a bearing 114. The bar 112 is shouldered at 115 and a spring 116 is compressed between the bearing 114 and shoulder 115 to hold the bar 112 normally in its forward position. A plate 117 is rotatably mounted on the feed roll shaft 106 and is arranged to be pivotally articulated at 120 to the back space bar 112. With this manner of connection, the plate 117 is rotated counterclockwise, as viewed in Fig. 3, when the back space bar 112 is actuated rearwardly upon pressing the finger piece 113 and when the bar 112 is urged forwardly by the spring 116 upon release of the finger on the finger piece 113, the plate 117 will be rotated clockwise to the position shown in the Fig. 2.

The plate 117 carries a pawl member 118 pivoted at 119 (Fig. 3). Pawl 118 is provided with an arm 121 which is caused to bear against the side of space bar 112 by the action of a spring 122 which continually tends to cause pawl 118 to rotate in a counterclockwise direction about pivot 119. However, in the position shown in Fig. 3, the spring 122, in tending to rotate the pawl 118 so as to cause the end 121 thereof to bear against the side of the bar 112, is prevented thereby from bringing the tooth of the pawl 118 into engagement with the teeth of the back space ratchet 123. Now, when the space bar 112 is actuated rearwardly, the pivot 120 is correspondingly actuated rearwardly so as to rotate the plate 117 in a counterclockwise direction. In so doing, the pivot 119 is also moved counterclockwise with the plate 117 away from bar 112 so that the spring 122 is enabled to rotate the pawl 118 counterclockwise to bring the tooth of the pawl 118 into engagement with the teeth of the ratchet wheel 123. This is made possible by the fact that the pivot 119 is moved farther away from the side of the bar 112 so as to permit the pawl 118 to be rotated since the arm 121 is held constantly in engagement with the side of the bar 112 as the pivot 119 is moved with the plate 117. Then, as the bar 112 is urged farther in the rearward direction, the pawl 118 will rotate the ratchet 123 counterclockwise, thus causing the feed roll 106 to rotate correspondingly to move the tape in a reverse direction (or rightwardly, as shown in Fig. 2). However, to enable the performance of the back space operation, it is necessary to hold the feed pawl 102 out of engagement with the main feed ratchet 104. This is achieved by means of the arcuate member 124 adjustably carried on the plate 117. Member 124 is provided with a depending portion 125 which is adapted to engage the pawl 102 as the plate 117 is rotated counterclockwise and in this manner disengages the pawl 102 from the ratchet 104 just prior to the engagement of pawl 118 with ratchet 123.

It is a feature of the present invention to cause the platen 18 to be back spaced in accordance with the back spacing operations applied to tape 93. To accomplish this result, the back spacing bar 112 is extended rearwardly and is pivotally connected to one arm of a bell crank lever 126, pivotally mounted at 127 on a bracket 128 secured to the printer frame. Lever 126 is provided with an arm 129 so conformed as to form a pivotal connection for one end of a link 131. The other end of link 131 is pivotally connected to arm 132 of a member 133 pivoted at 134 in a position properly located with respect to the ratchet wheel 71. Lever 133 is of a U-shaped conformation so as to provide a rigid bearing on the pivot shaft 134 and is provided with a second arm 135 having an open-ended slot which cooperates with a pin or stud 136 fixed to pawl lever 137. Lever 137 is provided with a long arm 138, the end of which cooperates with a pin 139 on the spacing lever 64. The pawl lever 137 is also provided with a projection 141 which coacts with a projection 142 on the detent pawl 75.

The spring 116 which tends to hold the bar 112 in a forward position with a shoulder 143 against the portion 114 of the frame also tends to hold the lever 126, link 131 and lever 133 in the position shown in Fig. 2 with the tooth 144 of pawl 137 disengaged from the ratchet 71. Then, when the back space bar 112 is actuated rearwardly by depressing the finger piece 113 the bell crank lever 126 will be actuated counterclockwise to move the link 131 rightwardly, which thereby imparts counterclockwise rotation to lever 133. This movement of lever 133 is transferred through the pin 136 to the pawl lever 137, thus bringing the tooth 144 of the pawl lever 137 against the ratchet 71. Substantially simultaneously with this action, the projection 141 acts upon the projection 142 to rotate the detent pawl 75 clockwise against the action of spring 77 to disengage the tooth thereof from the tooth of the ratchet 71 with which it is engaged. With this action also the arm 138 of the pawl lever 137 acts upon the pin 139 to move the prong 69 of the spacing lever 64 out of operative engagement with ratchet 71 to permit backward (or clockwise) rotation of the ratchet wheel 71.

Due to the action of the carriage return spring 73 which tends to rotate the ratchet wheel 71 in a clockwise direction as shown in Fig. 2, the ratchet wheel 71 is rotated only slightly or until the oncoming tooth 146 engages the pawl tooth 144. Then, when the finger piece 113 is released and the bar 112 is actuated forwardly by the spring 116, the bell crank 126 is rotated clockwise to move the link 131 leftwardly to impart clockwise rotation to the lever 133. This movement of lever 133 is then transferred through pin 136 to the pawl lever 137 to withdraw the tooth 144 from engagement with the ratchet tooth 146. Concurrently, the projection 141 permits through the projection 142, the detent pawl 75 to rotate counterclockwise by the action of spring 77 to bring the tooth of the detent pawl 75 into the path of the next tooth on the ratchet 71 so that as the tooth 144 is withdrawn from engagement with tooth 146 the pawl 75 acts to stop the motion of the ratchet wheel 71 in a clockwise direction when the oncoming tooth thereof engages the pawl 75. Through the instrumentality of the mechanism just described, the platen carriage 18 can be back spaced in correspondence with the back spacing of the tape, since the movement of the ratchet 71 is transferred through shaft 72 to the rack and pinion interconnection between the shaft 72 and the platen carriage 18.

The present invention contemplates the provision of mechanism for locking the keyboard, except the Rub out key 20 (punching) and the Character black-out key 30 (printing), against operation when the back spacing operation is being performed, which lock remains effective until all the back spaced code combinations have been rubbed out, or cancelled, by perforating thereover the all-marking or rubout signal. This arrangement is shown in Figs. 6, 7, 8, and 10 wherein the punch block 81 is the same as shown in Fig. 1. Fixed to the feed roll shaft 106 is the star wheel 108 which normally functions as a detent wheel, as indicated in Fig. 2. For the purposes of the present invention, the star wheel 108 is employed to actuate a rack bar 302 which is slidably carried in a guide member 303 which is provided with a cover plate 304. The guide member 303 and plate 304 for slidably guiding the rack bar 302 are supported on the frame member 41 by means of a bracket 305. The guide member 303 and plate 304 are further supported at their right-hand end, as viewed in Figs. 6 and 7, by a support bracket 306 which is attached to the punch block 81.

When the rack bar 302 is in its left-hand position the teeth thereon normally bear against the teeth of the star wheel 108 through the instrumentality of the spring biased member 307 which is slidably mounted in the guide member 308 attached to the under side of the member 303. Member 307 is provided with a spring post, to which one end of a spring 309 is attached, the other end being attached to a spring post located on the plate 303. With this construction the member 307 tends to urge the bar 302 against the teeth on the periphery of the star wheel 108, so that once the star wheel 108 is rotated in a counterclockwise direction, during the back spacing operation under the control of the back spacing bar 112, the spring 309 will move the member 307 to cause rack bar 302 to follow in a rightward direction (as viewed in Fig. 7) to insure the engagement or meshing of the various teeth. In response to each operation of the back spacing member 112 the rack bar 302 will be advanced one step to the right. After the rack bar 302 has been advanced the full distance toward the right commensurate with the number of teeth on the rack bar, the bracket 312, which is supported by a guide 313 secured to the bottom side of the member 303 and which engages a groove 314 on the bottom side of the rack bar 302 (as shown in Fig. 10), will be engaged by the end wall 315 of the groove 314 which will tend to urge the bracket 312 rightwardly against the action of its spring 316. In this manner the spring 316 through the instrumentality of the bracket 312 will tend to hold the rack bar teeth in engagement (in a leftward direction) against the teeth of the star wheel 108 to insure proper meshing or engagement during the forward (leftward, as viewed in Fig. 7) spacing movement of the tape.

Carried on the cover 304 of the rack guide is a bracket 317 on which is pivotally mounted, at 318, an indicator dial 319 which cooperates with an aperture 321 in the cover 322 of the printing apparatus. The indicator dial 319 is also provided with an extension 323 which cooperates with the right-hand end of the rack bar 302.

When the rack bar 302 is actuated rightwardly, it will upon the first character space in its movement, cause the indicator dial 319 to be rotated in a counterclockwise direction to bring the legend thereon, namely, "Rubout," into view through the opening or aperture 321 in the cover 322. So long as the rack bar 302 is actuated rightwardly the extension 323 will continue to ride upon the upper surface of said rack bar to hold the indicator dial 319 in its counterclockwise position with the legend showing through the aperture 321. On the other hand, when the rack bar 302 is actuated or returned leftwardly during the normal letter spacing or tape feeding movement, the indication "Rubout" will appear through the aperture 321 until the bar 302 has reached its farthest left-hand position, whereupon the indicator dial 319 will be rotated to its clockwise position (shown in Fig. 6) due to the extension 323 riding off of the top surface of the rack bar 302. The purpose of this indication is to apprise the operator of the fact that so long as the word "Rubout" appears through the aperture 321 there are further code combinations to be cancelled or rubbed out. The indicator dial 319 is normally biased in a clockwise direction, as viewed in Fig. 6, through the instrumentality of a torsion spring 320 (indicated more clearly in Fig. 6).

In connection with the feature of locking the keyboard against operation while the back spacing mechanism is operated and as long as the "Rubout" or cancellation operation proceeds, there is fixed to the feed roll shaft 106 a flanged sleeve member 324. There is freely mounted on the feed roll shaft 106 adjacent the flanged disc 324 a keyboard locking cam 325 which is recessed to embrace a disc of friction material 326 between the cam member 325 and the flanged disc 324. A spring 327 encompassing the feed roll shaft 106 is compressed between the bracket 328 and the cam 325 to exert pressure upon the cam 325 and the disc 324 to render the friction clutch effective.

The cam 325 is provided with a notch 329 which cooperates with a cam follower 331 guided in a bracket 332 at its upper end and in a bracket 333 at its lower end (Fig. 8). Bracket 333 is mounted on the keyboard base casting 334. Pivoted on bracket 333 at 335 is the keyboard locking bell crank 336, which is provided with a horizontal arm 337 that cooperates with the lower end of the follower 331. The depending arm of the bell crank 336 is engageable with a universal bar 338 pivoted on a shaft 339. A spring 341 extending between the pivot shaft 339 and the depending arm of the bell crank 336 normally holds the bell crank 336 in a rightward or counterclockwise position, and simultaneously acts to hold the arm 337 against the follower 331, which, in turn is held against the cam surface or notch 329 of the cam 325. Positioned above the universal bar 338 are a series of key levers 342, which upon operation or depression will actuate the universal bar 338 in a counterclockwise direction, as viewed in Fig. 8, to actuate, in turn, a link member 343 to release a clutch mechanism, in a manner fully described in the afore-mentioned Reiber patents.

The cam 325 is provided on its periphery with a square projection or lug 345 which cooperates with the laterally directed extremity of arm 346 of a bell crank lever 347 pivoted at 348 on the bottom side of the punch block 81. Lever 347 is spring biased in a counterclockwise direction by a spring 349. The lug 345 acts as a stop to normally limit the rotation of cam 325 to substantially one revolution so as not to prematurely unlock the keyboard.

The operation of the mechanism disclosed in Figs. 6, 7, and 8 is as follows: Assume that the tape perforating operation is proceeding normally and the star wheel 108 is being rotated clockwise and the bar 302 is being urged to its leftward position against the yielding stop 307, and that further rotation of the star wheel 301 merely causes the teeth of the star wheel to impinge successively against the teeth of the rack bar 302. In this condition of operation the lug 345 will have attained and held the position indicated 350 and shown in dotted lines in Fig. 7. Lug 345 is held thereat during further rotation of star wheel 108 by reason of the friction clutch. The indicator dial 319 will assume the position shown in Fig. 6, and the cam notch 329 of the cam 325 will receive the cam follower 331, thus permitting spring 341 to hold the universal bar latch out of engagement therewith as shown in Fig. 8. However, assuming now that it is desired to back space the tape, the back space bar 112 will be operated repeatedly. By means of the back spacing mechanism shown in Fig. 2 the star wheel 108 will be rotated step by step in a counterclockwise direction (as viewed in Fig. 7), as will also the cam 325. The parts disclosed are so designed and arranged that in response to the first angular step in a counterclockwise direction the notch 329 of the cam 325 will, through its contour, push the follower 331 downwardly so as to rotate the latch 336 against the action of its spring 341 to bring the shouldered extremity of the depending arm underneath the universal bar 338 to prevent its actuation, for a predetermined time, by the key levers 342. Thereafter for one revolution of the cam 325 the follower 331 will bear against the face of the cam 325. Moreover, after the bar 302 has been actuated rightwardly the first step due to the interengagement of the teeth on the periphery of the star wheel 108 and the teeth on the rack 302, the indicator dial 319 will be actuated counterclockwise to bring the legend thereon into register with the opening 321 to apprise the operator that the back spaced characters will have to be rubbed out before he can continue to operate the keyboard and thus operate the perforator in the normal manner. When back spacing, the star wheel 108 and cam 325 will be actuated in a counterclockwise direction until the lug 345 on cam 325 has moved from the normal position indicated 350 to the position indicated 345. At this time the rack bar 302 will have been actuated rightwardly so that the end 315 of the groove 314 will actuate the yieldable stop member 312 against the action of spring 316 thereby holding the teeth of the rack into engagement with the star wheel teeth. When it is desired to advance the tape to rub out or cancel the back spaced perforations, the rubout key 20 (Fig. 1) of the series of keys 342 (Fig. 8) will be actuated repeatedly, a notch being provided in the universal bar 338 to permit the operation of said key, in which case there is provided for said key a separate means for releasing the clutch normally controlled by the link 343. With this arrangement, the operator cannot operate any of the keys 342 except the rubout key and this latching up or locking of the universal bail 338 guards against false operation of said keys. The operator, of course, is further advised of the necessity of rubbing out or cancelling the perforated code by the position of the indicator dial 319. The lockout mechanism and indicator dial will be brought to normal after the last character has been rubbed out, in which case the notch 329 will have returned to the position shown in Fig. 6 so as to permit the cam follower 331 to enter therein and release the latch 336 from locking engagement with the universal bail 338. The indicator dial will again have returned to the position shown in Fig. 6.

In Fig. 9 is shown an arrangement for preventing the operation of the back space mechanism when the platen carriage 18 is in its zero or beginning-of-line position, after, for example, a carriage return operation has been consummated. As also shown in Fig. 1 of the principal embodiment of the invention, the platen carriage is indicated in Fig. 9 as 18 and is engaged by the carriage return strap 74 which terminates in a carriage return spring housing 73. The housing 73 rotates about a pivot 351 and carries on the face thereof near the periphery a blocking member 352, which is effective when the carriage return housing is in the position shown in Fig. 9 (which is that position whereat the platen carriage 18 is in its beginning-of-line position). In this position the blocking member 352 acts to prevent the operation of the back space bar 112 for the operation of the platen back space mechanism. Accordingly, rotation of the back space lever 126 about its pivot 127 is prevented. Therefore, until the blocking member 352 is removed from the path of the bar 112 the back space mechanism for the platen 18 cannot be operated. Thus, after the first character has been printed on the page and the platen 18 has been moved one character space (toward the left as viewed in Fig. 9) the blocking member 352 will have been moved with the rotating carriage return spring housing 73 one angular step, which in accordance with the present disclosure is sufficient to bring the blocking member 352 out of the path of the member 112 so that thereafter the member 112 may be readily operated by the back spacing mechanism, exemplified in Fig. 2, by the bar 112.

Under certain operating conditions, it is desirable to prevent back spacing of the platen 18 when the tape 93 is back spaced. Such a condition would arise, for example, when the code signal combination (that is, "figures" shift or "letters" unshift) which was perforated in the tape did not require that a letter spacing or character spacing movement of the spacing mechanism be imparted to the platen 18. Thus, when the platen shift ("figures") or platen unshift ("letters") code is perforated in the tape under the control of the selector mechanism 33, the mechanism of the printer 16 is such as described in the afore-mentioned Reiber patent, so as to suppress the printing and character spacing operations of the mechanism since the noted code combinations are function code combinations.

In Figs. 11, 12, 13, and 14 there is shown one method of preventing the back spacing of the platen 18 when the code combination of the tape being back spaced is one that did not require the effectuation of a platen spacing movement. Having reference to Fig. 11, the punch block is indicated as 151, and is similar to the punch block 111 shown in Fig. 2. In accordance with this embodiment of the invention, a sixth hole is perforated in the tape automatically whenever a "figures" shift or "letters" unshift code combination (or any other desired code combination) is to be perforated. Then, when the tape is back spaced, a sensing mechanism is provided which automatically senses the tape to determine when a shift or unshift combination is back spaced, in which case the back space mechanism of the platen 18 is prevented from being operated.

With the arrangement shown in Fig. 11, there is also provided a sixth interponent 152 which cooperates with the sixth punch 153. Interponent 152 is pivotally articulated to a sixth selector lever 154, similar to selector levers 82 shown in Fig. 2. However, lever 154 is provided with a depending bail portion 155. Unlike selector levers 82, the lever 154 is not provided with a projection 85 which coacts with the transfer bail 51, nor is it provided with a shoulder 86 which cooperates with the T-levers 36. Moreover, the lever 154 is not provided with a spring located such as spring 88 in Fig. 2, but is provided with a spring 156 which normally biases the lever 154 in a counterclockwise direction about pivot 83. With this construction the lever 154 is caused to rotate counterclockwise only when the "figures" shift and the "letters" shift (or other designated) code signals are received.

The depending portion 155 is conformed with a U-shaped projection, as shown at 157 (Fig. 13), so that the lever 154 can be rotated counterclockwise in response to the "figures" shift signal, which causes the clockwise actuation of the No. 3 lever 82 and the counterclockwise actuation of the Nos. 1, 2, 4, and 5 levers 82. In response to the "letters" shift all the levers 82 are actuated to their counterclockwise position. Thus, upon the receipt of either a "figures" shift or a "letters" shift code combination the interponent 152 will be actuated rightwardly to bring its projection 158 into the path of the punch pin 153. The punch pin 153, instead of being slidably mounted in the punch block 151 is slidably carried in a bar 159, as shown in Fig. 14. The punch 153 is provided with an enlarged end 161 which cooperates with a member 162, secured to the punch hammer 163 which is pivoted at 164. With this arrangement, the actuation of the punch hammer 163 in a clockwise direction (as viewed in Fig. 11) with the interponent 152 positioned with its projection 158 in alignment with the punch 153 will cause the punch to perforate the tape 165 in the sixth hole position. Then, when the punch hammer 163 is rocked in a counterclockwise direction, the head 161 will be engaged by the member 162 to withdraw the punch 153 from the tape 165.

In this embodiment of the invention, the back spacing and forward spacing mechanisms are exemplified by the feed roll 166, and may take substantially the form as shown in Fig. 15. After the punching operation has been performed, the tape 165 will be advanced leftwardly, as shown in Fig. 11, one step by the operation of the tape feed pawl (not shown).

When the back spacing operation is to be performed by the depression of the back spacing bar 167, as will presently appear, the bar 159 is operated in a manner to permit the sensing pin 168 integral therewith to sense the tape for the presence or absence of a sixth hole. If a sixth hole is found in the tape, the back spacing of the platen 18 will be prevented and if a sixth hole is not found in the tape, the back spacing of the platen 18 will be effected simultaneously with the back spacing of the tape. The back spacing bar 167 is slidably supported in the punch block 151 and in a bracket 169 (Fig. 12). A spring 171 encircles the bar 167 and is compressed between the bracket 169 and a flange 172 integral to the bar 167, whereby the bar 167 is normally held in its leftward position as viewed in Fig. 12. Bar 167 is also provided with narrowed or restricted portion 173 which is spanned by the forked lower end of a lever 174 pivotally mounted at 175, the upper end of which is provided with a slotted hole to permit the bar 159 to extend therethrough. A spring 176 encircles the bar 159 and is compressed between the upper end of lever 174 (and collar 170) and a flange 177 integral with the bar 159.

The right-hand end of bar 159 (as viewed in Fig. 12) is pivotally articulated to the upper end of the vertical arm of a bell crank lever 178 pivotally mounted at 179. The extremity of the horizontal arm of bell crank 178 cooperates with the flange 172 of the bar 167. When the back space bar 167 is depressed by applying pressure to the finger piece 181 it imparts counterclockwise rotation to lever 174 (as viewed in Fig. 12) thus tending to urge, through spring 176, the bar 159 leftwardly to bring the sensing pin 168 into sensing relation with the tape 165. During this probing operation the back spacing of the tape will be delayed, since the back spacing mechanism is in principle similar to that shown in Fig. 15. If a perforation is found by the pin 168 in the sixth position of the tape 165, the sensing pin 168 will pass therethrough and permit the bar 159 to move a predetermined amount leftwardly. In this event, the bar 159, through its pivotal articulation with lever 178, will cause the bell crank lever 178 to rotate counterclockwise about pivot 179 to bring the end of its horizontal arm into the path of the flange 172 on the back space bar 167. It is, of course, understood that the space between the flange 172 and the end of the horizontal arm of lever 178 is sufficient to permit the back spacing member 167 to be moved rightwardly a distance sufficient to effectuate the sensing operation between the sensing pin 168 and the tape 165, as well as to effect the back spacing operation. Moreover, the distance between the end of the bar 167 and the end of the bar 182 is also sufficient to permit the effectuation of these operations. That is, the space indicated 183 is sufficiently great to permit a preliminary testing movement of the bar 167 to determine whether a perforation in the sixth position has been found by the sensing pin 168, and to effect the back spacing operation. It is observed that the positioning of the horizontal arm of the lever 178 into the path of the flange 172 will prevent further movement rightwardly of the bar 167 (as viewed in Fig. 12). Rightward movement being thus impeded, the bar 182, which is comparable to the bar 112 of Fig. 2 will not be operated, and hence the back spacing mechanism of the platen 18 will not be operated.

However, if there is no perforation in register with the sensing pin 168 in the sixth position of the tape, the bar 159 will only be moved a limited distance so as to bring the pin 168 into contact with the tape 165. Thereafter, upon further movement of the bar 167, the spring 176 will be compressed upon the counterclockwise rotation of the lever 174. In this event, the bell crank lever 178 will not be rotated so as to bring the end of its horizontal arm into the path of the flange 172, thereby permitting further movement of the bar 167 so as to take up the space 183 and bring the bar 167 into contact with the bar 182. Thus, upon further rightward movement of the bar 167, the bar 182 will be actuated rightwardly to effect the operation of the back spacing mechanism for the platen 18, as previously shown and described.

Provision has been made for permitting the operation of the back spacing mechanism for the tape 165 while the sensing pin 168 is engaged in a sixth hole in the tape. To achieve this result, the die plate 184 for the sixth punch 153 is a slidable member carried in the punch plate 185. The punch plate 185 is provided with holes 186 to cooperate with the normal code punches (comparable to punches 99 in Fig. 2); but, for the sixth punch 153 a slotted hole 187 is provided, so that the feeler pin 168 in penetrating the tape can move the plate 184 to bring the hole therein into alignment with the code punch holes 186. In other words, when a hole is found in the sixth position of the tape by the pin 168, and a back spacing operation is performed with the pin 168 in this position, the back spacing of the tape will not be opposed since the bar 159 is permitted to rotate a slight angular amount in a counterclockwise direction so that the pin 168 can move rightwardly (as viewed in Fig. 11) to the position in alignment with the punches 186 (since it is understood that the tape after the punching operation, previously described, is advanced one space in a tape advancing direction). A spring 188 is provided to hold the slidable die plate 184 in its leftward position, as viewed in Fig. 13.

Another modification of the present invention is shown in Figs. 15 to 19, inclusive, and contemplates the control of the platen back spacing mechanism under certain operating conditions to prevent the operation of the platen back spacing mechanism by means of a device for sensing the complete code combination instead of merely a hole in the sixth position in the tape. Having reference to Figs. 15 to 19, inclusive, the punch block is indicated as 191, and is provided with a plurality of punches 192 operable between guide plates 193 and 194. A die plate 190 is spaced from the plate 194 to permit the tape 195 to pass therebetween. The punches 192 are provided with enlarged end which cooperates with the portion 196 of a punch hammer 197 pivoted at 198. A series of interponents 199 are operated in the manner described in the principal embodiment of the invention to bring the projection 201 thereon into or out of registration with the punches 192.

Upon each operation of the perforating mechanism the pawl 202 pivoted at 203 at the extremity of the tape feed lever 204 is reciprocated to impart clockwise rotation to the tape feed ratchet 205, the pawl 202 being normally biased in a counterclockwise direction to keep the tooth thereon in engagement with the ratchet 205. The ratchet 205 is integral with a tape feed shaft 206 to which is also secured the tape feed roll 207. Clockwise rotation of the feed roll 207 will cause the tape 195 to be advanced leftwardly, as viewed in Fig. 15. Now, when the "letters" unshift and "figures" shift combinations are punched in the tape 195, mechanism is provided in the printer apparatus 11 for suppressing the spacing movement of the platen 18 despite the fact that the tape 195 is spaced. Therefore, when it is desired to back space the tape 195, it is not necessary to effect the back spacing of the platen 18 if the code combination being back spaced in the tape is a "figures" shift or "letters" unshift code combination (of course, other combinations can be employed).

To achieve this result, a sensing lever 208 is provided which is pivoted at 209 to a bracket secured to the punch block 191. At the extremity of the arm 211 of the lever 208, a series of sensing pins 212 are carried, which are guided between the plates 193 and 194 and which are spring loaded so as to cause them to press against the arm 211, so that when the arm 211 is caused to rotate slightly in a counterclockwise direction, the springs 214 will cause the sensing fingers 212 to press against the tape 195 if no perforations are sensed in the first, second, fourth and fifth code position, simultaneously (which is the "figures" code combination). Lever 208 is also provided with an arm 215 which carries thereon in spaced relation, a pair of adjustable studs 216 and 217. Cooperating with stud 216 is a plate 218 carried on the back space bar 219. Stud 217 cooperates with a bell crank lever 221 which is pivoted to the platen back space bar 222 at 223. Bell crank 221 is normally biased in a counterclockwise direction about its pivot 223 by a spring 224. The platen back space bar 222 is guided at its forward end by a shoulder screw 210 engaging a slot 220 in the bar 222, the slot 220 being of sufficient length to permit the screw 210 to reciprocate therein without imparting movement to the bar 222, since, as will presently appear, the bar 222 is reciprocated under the control of lever 221 and a spring 230. The stud 216 cooperates with a two-level notch 227 in plate 218 and normally rests upon the upper level 225 of the notch 227.

Now, when the back space bar 219 is depressed by applying pressure to the finger portion 226 the plate 218 will be moved rearwardly, as viewed in Fig. 15, to cause the stud 216 to fall from the upper level 225 to the lower level of notch 227 due to the pressure applied by springs 214 upon the arm 211 if the sensing pins 212 have found perforations in the tape 195 in register therewith. This position is shown in Fig. 18, where it is seen that the stud 217 has caused the lever 221 to be rotated in a clockwise direction so as to cause the shoulder 228 thereon to be moved out of the path of shoulder 229 on the back spacing bar 219. Upon further movement of the bar 219 rearwardly, the stud 216 will ride up upon the inclined surface 231 of plate 218 to cause the lever 208 to rotate clockwise to retract the sensing pins 12 from the perforations in the plate 195 preparatory to effecting the actual back spacing operation of the tape.

At this time, when the lever 208 has been rotated clockwise, the pawl 232 effecting the back spacing operation of the tape 195 will have traveled from the solid line position shown in Fig. 15 to the dotted line position 233. So, when the bar 219 is fully depressed, the pawl 232 will act upon the back spacing ratchet 234, which, through the feed roll 207 will effect the back spacing of the tape 195. It is noted that since the lever 221 has been, during the preceding operation, rotated out of operative relation with the shoulder 229, the bar 222 which is connected to the back spacing mechanism of the platen 18 has not been operated. It is, of course, understood that clearances and motions between the various elements are contemplated, such that the probing and sensing operations and the conditioning operations pursuant thereto are consummated before the back spacing operation is initiated. Upon the release of the back space bar 219 it is returned to its forward position by a spring 236.

When the sensing pins 212 do not sense a "figures" shift or "letters" unshift, the lever 208 will remain substantially in its clockwise position as shown in Fig. 15 with the pins 212 bearing against the tape 195 so that when the back space bar 219 is depressed, the shoulder 229 thereof is free to engage the shoulder 228 of bell crank lever 221 to impart rearward motion to the platen back space bar 222. The back spacing of the tape is performed through the instrumentality of the pawl 232 and the back spacing ratchet 234. It is necessary to prepare for this operation by disengaging pawl 202 from the ratchet 205, and to achieve this result an arm 237 is provided on the pawl lever 232 which cooperates on the cam arm 238 on the pawl 202 so that as the pawl 232 is operated rearwardly by the lever 219 (to which it is pivotally connected at 239 on the extension 241), the arm 237 will urge the pawl arm 202 in a clockwise direction against the action of its spring 242 to withdraw the pawl tooth from the ratchet 205. The arm 211 of bell crank lever 208 is provided with an opening 243 (Fig. 17) sufficiently large to permit the punches 192 to extend therethrough, and has a pair of lugs 244 each of which spans the shoulders of a pair of feeler pins 212 to control the movement of the pins 212.

A further modification of the back spacing feature of the present invention is shown in Figs. 20 to 23, inclusive. Having reference to Fig. 20 the punch block is indicated as 251 in which are slidably carried between guide plates 252 and 253 a series of punches 254. The punches 254 are provided with enlarged ends which cooperate with the member 255 of the punch hammer 256 which is pivoted at 257. A series of interponents 258 are provided which are controlled by the sensing mechanism, as disclosed in the principal embodiment, to bring the projection 259 into or out of the path of the punches 254 to effect their operation. Mounted on the punch block 251 is a lever, indicated generally as 261, which is pivoted at 262. The horizontal arm 263 of lever 261 carries at its extremity a series of sensing pins 264 which cooperate with a series of holes adjacent to the punch holes in the die plate 265. Bell crank lever 261 is also provided with an arm 266 which is pivotally articulated at its free end to one end of a link 267. The other end of link 267 is provided with a slot 268 which cooperates with a stud 269 on a latch arm 271 carried on the back space bar 272. A spring 273 extends between the stud 269 and the end of lever arm 266. Back spacing bar 272 is provided with an extension 274 on which are mounted members 275 and 276 which control the operations of the bell crank lever 261 as will presently appear. Lever 266 is provided with an arm 280 which cooperates with the member 276. A spring 277 is attached to the extremity of arm 280 so as to urge the lever 261 normally in a counterclockwise direction. The arm 266 is provided with a cam projection 279 which cooperates with the member 275. Back space bar 272 is also provided with a rearwardly extending portion 281 which is provided with a slot 282 through which extends a stud 283 which, as shown in Fig. 21, is secured to a bracket 284 fixed to the punch block 251. Also slidably guided by the stud 283 is the bar 285 which governs the operation of the platen back space mechanism shown in Fig. 2.

The operation of the modification shown in Figs. 20 to 23 is as follows: The perforation of the code combinations in the tape is governed by the operation of the interponents 258 under the control of the selector mechanism, bringing the projections 259 permutably in alignment with the punches 254 so that when the punch hammer 256 is operated, the tape 286 is perforated correspondingly. When it is desired to back space the tape 286, the back space lever 272 is depressed or operated by applying pressure to the finger piece 287.

During the initial portion of the rearward movement of the back space bar 272, the member 276 will be moved away from the arm 280, permitting the spring 277 to rotate the lever 261 in a counterclockwise direction to bring the sensing pins 264 into contact with the tape 286. As previously described, there are four sensing pins 264 arranged in the first, second, fourth, and fifth code positions corresponding to the "figures" or shift code signal. If the sensing pins 264 are blocked in one or more of the code positions, the lever 261 will not be rotated counterclockwise sufficiently to actuate the link 267 to rotate the latch 271 out of the path of shoulder 288 of bar 285. Thus, upon further movement of the bar 272 rearwardly, the pawl 289 will engage the ratchet 291 to rotate the feed roll counterclockwise one angular step to effect the back spacing of the tape.

If perforations are in alignment with the sensing pins 264 in all of the first, second, fourth, and fifth code positions, the lever 261 will be rotated sufficiently by the link 267 to cause the link 267 to disengage the latch 271 from the shoulder 288. It is noted in Fig. 20 that the pawl 289 is of sufficient length so that its toothed extremity will not engage a tooth of the back space ratchet wheel 291 until the sensing pins 264 have performed their function of sensing the tape (Fig. 23) and have returned to the position shown in Fig. 20 clear of the tape so that the tape is free to be back spaced. Thus, when the back space bar 272 has been actuated to the position shown in Fig. 23, the lever 261 is rotated into the position shown with the sensing pin 264 into the perforation of the tape, thus permitting the lever 261 to rotate sufficiently to actuate the link 267 to rotate the pawl 271 out of the path of the member 285. When the back space bar 272 is further depressed, the member 275 coacts with the projection 279 to rotate the lever 261 in a clockwise direction to withdraw the sensing pin 264 from the perforation in the tape thus stretching the spring 273 and returning the link 267 rightwardly to the dotted line position shown in Fig. 23. The arm 271 will not return to its clockwise position but will be held in its position shown in Fig. 23 so that when the back space bar 272 is depressed the full amount, the pawl 289 will engage the back space ratchet 291 and back space the tape, and the bar 285 will not have been operated so that the platen is not back spaced during this operation. The spring 293 functions to return the back space bar 272 to its forward position. In operating the back spacing ratchet 291, the feed pawl 294 of the normal spacing mechanism is disengaged from its ratchet in the manner shown in the embodiment illustrated in Fig. 15.

In Figs. 24 and 25 there is shown a modified arrangement for locking up the keyboard against operation under certain conditions of operation. For example, when the apparatus has been operated in the "figures" shift or upper case position and it is desired to back space certain of the characters for cancellation, the mechanism according to Figs. 24 and 25 is provided to remind the operator to return the type wheel to the "figures" shift position after the rubout or cancellation operation has been performed, because during the cancellation or rubout operation the type wheel has been automatically shifted to the "letters" or lower case position, since the "letters" unshift and rubout code combinations are identical; that is, they are both an all-marking code combination. More specifically, when the rubout key is operated with the type wheel in the upper case position, the type wheel will be returned to the lower case position, and mechanism will be operated to lock the universal bail of the keyboard against operation, thereby locking the keyboard. In this condition of operation only the rubout key can be actuated following the back spacing operation, and if the type wheel was in the upper case position before the back spacing operation took place, the operator is reminded to return the type wheel again to the upper case position because of the fact that the keyboard is locked against operation and the operator is thereby unable to continue operating the apparatus in the normal manner until the type wheel is so returned. In this manner, erroneous operation is prevented.

In Fig. 24 the punch block is indicated as 353 and the back spacing bar is indicated as 354, these elements being substantially identical to the corresponding members shown in the illustrations previously described. Mounted on the back spacing bar 354 is a stud 355 which cooperates with the vertical arm of a bell crank lever 356 pivoted at 350. To the extremity of the horizontal arm of the bell crank lever 356 is pivotally connected the upper end of a link 357. Pivotally mounted at the lower end of the link 357 at 358 is a lever 359. Adapted to cooperate with the right-hand end of lever 359 (as viewed in Fig. 24) is the vertical arm 361 of a bell crank lever 362 which is pivoted at 363. Lever 362 is normally biased in a counterclockwise direction (as viewed in Fig. 25) against a suitable stop by a spring 364.

The horizontal arm of bell crank lever 362 operates upon a bracket 365 secured to the type wheel shift frame 366. The type wheel 367 is slidably mounted on the type wheel shaft 368 for reciprocation between the full line position shown in Fig. 25 and the dotted line position 369.

When the type wheel shift member 366 has been elevated to the "figures" or upper case position indicated 369, the bell crank lever 362 will be rotated to the dotted line position indicated at 371, in which position the vertical arm of lever 362 will act to block counterclockwise rotation of lever 359. Referring to Fig. 24, the left-hand end of lever 359 cooperates with the free end of a latch lever 372 which is pivoted at 373 on a bracket 374. Lever 372 is normally biased clockwise by a spring 375. Lever 372 is provided with a shoulder which cooperates with the upper end of a locking lever 376 pivotally mounted on a pivot shaft 377. Lever 376 is normally biased counterclockwise by a spring 378. The lower end of lever 376 is provided with a lateral projection which locks the universal bail 379 against rotation about its pivot 381 when the locking lever 376 is permitted to assume its counterclockwise position, as will presently appear. Articulated to the universal bail 379 is a link 382 which functions to release the clutch (not shown) for governing the rotation of the transmitter shaft.

Also mounted on the pivot shaft 377 is a bell crank lever 383 which is normally biased in a counterclockwise direction about the pivot 377 by a spring 384 to bring the laterally directed portion 385 (Fig. 25) of its horizontal arm into contact with the lower edge of a key lever 386. The link 357 is normally urged downwardly by a spring 387 secured to a stud carried thereon (Fig. 25).

Operation of the mechanism shown in Figs. 24 and 25 is as follows: Assume that the tape is being perforated and a record is being made upon the page, with the type wheel 367 in the upper case position, indicated by the dotted line 369 in Fig. 25, and that it becomes necessary to correct a portion of the record thus made. Accordingly, the back spacing bar 354 will be operated successively the required number of times to back space the tape an amount corresponding to the material to be deleted. Upon the first operation of the back space bar 354 rightwardly, as shown in Fig. 24, the stud 355 thereon will operate bell crank lever 356 clockwise to raise the link 357. Since the type wheel shift member 366 is in the upper case position, the lever 362 is positioned with its arm in the position shown in dotted lines 371, with the lower extremity thereof in the path of the right-hand end of lever 359.

Thus, when link 357 is raised, lever 359 will rotate about the lower end of lever 361 in a clockwise direction, causing the left end of the lever 359 to pivot the arm 372 in a counterclockwise direction against the action of the spring 375. This movement of lever 372 will permit the upper end of the lock lever 376 to be freed to respond to the pull of its spring 378, whereby the latching lever 376 will be rotated counterclockwise to bring the lower end thereof below the universal bail blade 389. In this condition, the key levers are locked against operation due to their inability to rotate the universal bar 379 counterclockwise. The locking of the keyboard in this manner has been rendered possible by the fact that the type wheel shift member 366 is in the upper case position, thus holding the lever 362 in its clockwise position (shown dotted in Fig. 25) against the action of spring 364 to bring the depending arm 361 into the path of the lever 359.

When the deleting or rubbing out operation is begun, the first rubout signal will act in the manner of a "letters" or unshift signal in addition to its effect of rubbing out or cancelling the code perforation in a tape with an all-marking signal. In response to this rubout signal the shift member 366 will be returned to its lower position, shown in full line in Figs. 24 and 25, thus permitting the spring 364 to return or rotate the lever 362 to its counterclockwise position, as shown in Fig. 25. As described, the keyboard is locked against operation during the rubout or cancellation operation.

After the cancellation operation has been completed and the operator wishes to continue to prepare the record or to write the corrected matter he will attempt to operate the keyboard in the usual manner but will find that he is prevented from doing so because the universal bar 379 has been locked up. This warns the operator that he must return the type wheel to its "figures" shift or upper case position, shown in dotted lines in Fig. 25. Before he can do this he must unlock the keyboard and to accomplish this result a special key (not shown) is provided which is notched above the universal bar or which is positioned outside of the range of operation of the universal bar. This special key lever acts to rotate the pivot shaft 377, to which is also fixed the bell crank lever 383, in a clockwise direction against the action of its spring 384. This rotation of lever 383 acts through its laterally directed extremity 390 to unlatch the locking lever 376, thus rotating the lever 376 clockwise against the action of its spring 378 to bring the upper end thereof again into engagement with the shoulder on the arm 372. Lever 376 is thus held in its clockwise position as shown in Fig. 24, and the universal bail 379 is free to be operated thereafter by the keys 386. However, connected to said special key is a release mechanism (comparable to link 382) for releasing the transmitting clutch, so that upon operation of said special key, the "figures" or shift code signal will be transmitted, the effect of which upon the printer unit will be to shift the member 366 again to the dotted line position, shown in Fig. 25.

In Figs. 26 and 27 there is shown an arrangement for marking the tape while performing the back spacing operation, to indicate to the operator, while he is performing the cancellation or deleting operation, when all of the back spaced code combinations are deleted or rubbed out. Mounted on the back space bar 391 is a bracket 392 to which is pivoted at 393, a lever 394 which normally tends to rotate counterclockwise about the pivot 393 due to a torsion spring 390 associated therewith. The left end of the lever 394 slopes upwardly toward the left and cooperates with a stud 395 carried on a bracket 396 secured to the punch block 397. The right end of the lever 394 is provided with a latch portion which cooperates with the lower end of the resilient portion of a depending lever 398 pivoted at 399 to a bracket 401 secured to the punch block 397. Lever 398 is normally biased in a counterclockwise direction about the pivot 399 by a spring 402, which rotation is limited by a stop 403. The lever 398 is also provided with a laterally and inwardly directed arm 404 which carries at its extremity a printing pad 405, for the inking of which suitable provisions may be made. The die plate 406 of the punch block 397 is provided with a special aperture 407 through which the printing pad 405 is operative, and through which the operator may view the markings made by the printing pad 405 upon the tape.

In operation, the mechanism for marking the tape is normally in the position shown in Figs. 26 and 27, so that when the back spacing operation is to be performed the back space bar 391 is depressed (operated leftwardly, as viewed in Fig. 27), and through the mechanism indicated in Figs. 26 and 27 as 408, the tape back spacing mechanism is operated in the manner described in connection with Fig. 2. The latch lever 394, also actuated with the back space bar 391, operates, through the latch end, upon the lever 398 to rotate said lever clockwise about the pivot 399 to press the printing pad 405 against the tape. After a predetermined amount of movement of the member 391, the latch lever 394 engages the stud 395, and due to the camming action therebetween, the lever 394 is rotated clockwise to release the latching end from the resilient depending arm of lever 398 to permit the spring 402 to return the lever 398 counterclockwise against the stop 403. As the back space bar 391 is then fully depressed, the tape is back spaced through the instrumentality of the mechanism indicated as 408, and the mark just made on the tape appears through the opening 407. Thereafter, when the cancellation or deleting operation is performed the marks appearing through said opening 407 will apprise the operator of the number of combinations to be deleted.

In Figs. 28 and 29 is illustrated an alternative method for indicating to the operator when the back spaced code combinations have been rubbed out or deleted. In this arrangement, an electric lamp is provided in the punch block, and the light from the lamp will project through the perforations in the tape, where it will engage the attention of the operator and apprise him that there are more back space code combinations to be deleted. In Figs. 28 and 29 the punch block is indicated as 411 and the punches as 412. The die plate 413 is provided with an opening or aperture 414 substantially the width of the tape and embracing one transverse row of perforations. This aperture 414 opens into a recess 415 in the punch block 411. Covering the front of this recess 415 is a plate 416 on which is mounted a support 417 for an electric lamp 418. The lamp 418 is, of course, illuminated continuously and the light therefrom is emitted through the opening 414 only when there are perforations in the tape that have not been deleted; at all times thereafter the opening 414 will be obstructed by blank tape.

A slide 391 (Figs. 1, 2, and 3) is provided for disabling the normal tape feed pawl 102 by disengaging it from the ratchet 104 and holding it disengaged, when it is desired to thread a new strip of tape into the punch block or to quickly withdraw a section of tape. Slide 391 is suitably guided slidably with respect to the punch block 81 and the tape feed mechanism, and is provided with a vertical portion 392 which cooperates with extension 393 on the pawl 102. Slide 391 is also provided with a finger portion 394 and an indicator pointer 395 integral therewith. Pointer 395 cooperates with a suitable legendary member (not shown) to visually apprise the operator of the operating condition of the perforator.

Although specific embodiments of the features of invention have been disclosed and described herein, it will be understood that the invention is not limited to such specific embodiments, but is capable of modification, reorganization, rearrangement and substitution of parts and elements without departing from the spirit of the invention and within the scope of the appended claims.

What is claimed is:

1. In an initiating recorder, transmitting means, a signal responsive selector, a printing mechanism and a perforating mechanism controller by said selector to record characters corresponding to generated signals in one web and to perforate equivalent signals in another web, and a common means operable to back space both webs substantially simultaneously preparatory to rubbing out a printed and a perforated character.

2. In an initiating recorder, transmitting means, printing instrumentalities comprising platen means and typing means movable relative to each other to form character spaces, code marking means, means for causing a predetermined similar response in said platen means and said code marking means, means for causing simultaneous reverse response in said platen means and the record of said code marking means, and means controlled by said last recited means for preventing operation of said transmitting means.

3. In an initiating recorder, transmitting means, printing instrumentalities comprising platen means and typing means, escapement mechanism for effecting relative movement between said platen means and said typing means, code marking means, strip moving means in said code marking means, means for causing a predetermined similar response in said escapement mechanism and said strip moving means, means for causing a reverse response in said escapement mechanism and said strip moving means, and means controlled by said last recited means for preventing operation of said transmitting means.

4. In an initiating recorder, transmitting means at the recorder to actuate two recording means, printing instrumentalities comprising platen means and typing means movable relative to each other to form character spaces, code marking means, means for causing a predetermined similar response in said platen means and said code marking means, means for causing simultaneous reverse response in said platen means and in the record feed means in said code marking means, and means controlled by said last recited means for preventing operation of said transmitting means.

5. In an initiating recorder, keyboard mechanism for controlling the operation of said apparatus, printing instrumentalities in said apparatus comprising platen means and typing means, case shift mechanism for effecting relative case shifting movement between said platen means and said typing means, escapement mechanism for effecting relative character-spacing movement between said platen means and said typing means, perforating means, strip moving means in said perforating means, a common back spacing means for reversing the operation of said escapement mechanism and said strip moving means, and means operative in response to the operation of the common back spacing means to lock said keyboard mechanism against operation, said locking means rendered effective by a predetermined operation of the case shift mechanism.

6. In an initiating recorder, key operated means in said recorder for controlling the operation of said recorder, printing instrumentalities comprising platen means and typing means, pawl and ratchet mechanism for effecting relative movement between said platen means and said typing means, means for effecting relative case shifting movement between said platen means and said typing means, perforating means, strip moving means in said perforating means, signal controlled means responsive to the effectiveness of said key operated means for causing a predetermined similar response in said mechanism and said strip moving means, escapement mechanism for reversing the movement between said platen means and said typing means, back spacing mechanism for said strip moving means, common means effective to control the operations of said escapement mechanism and said back spacing mechanism simultaneously, conditioning means controlled by said case shifting means, and means controlled by said conditioning means to lock said key operated means against operation.

7. In an initiating recorder, printing instrumentalities comprising platen means and typing means, character-spacing means for effecting relative movement between said platen means and said typing means, code marking means, strip moving means in said code marking means, signal controlled means by an initiating transmitter in said recorder for causing a predetermined similar response in said character-spacing means and said strip moving means, carriage return means for a certain one of said instrumentalities, escapement mechanism for reversing the movement between said platen means and said typing means, back spacing mechanism for said strip moving means, means dually effective to control the operations of said escapement mechanism and said back spacing mechanism simultaneously, and means carried by said carriage return means and cooperative with said dually effective means for preventing the operation of the last recited means.

8. In an initiating recorder, transmitting means at said recorder, printing instrumentalities comprising platen means and typing means movable relative to each other to form character spaces, code marking means, means for causing a predetermined similar response in said platen means and said signal determining means, means for causing simultaneous reverse response in said platen means and said code marking means, a cam controlled by said last recited means, and means controlled by said cam for preventing operation of said transmitting means.

9. In an initiating recorder, transmitting means in said recorder, printing instrumentalities comprising platen means and typing means movable relative to each other to form character spaces, code marking means, means for causing a predetermined similar response in said platen means and said code-marking means, common means for causing simultaneous reverse response in said platen means and said code marking means, a cam controlled by said last recited means, means controlled by said cam for preventing operation of said transmitting means, and means for indicating the condition of operation of said cam controlled means.

10. In an initiating recorder, key operated means for controlling the operation of said recorder, recording instrumentalities in said recorder comprising platen means and typing means, means for effecting relative case shifting movement between said platen means and said typing means, spacing mechanism for effecting relative character-spacing movement between said platen means and said typing means, code marking means, strip moving means in said code marking means, a common back spacing means for reversing the operation of said spacing mechanism and said strip moving means, conditioning means controlled by said case shifting means, and means controlled by said conditioning means to lock said key operated means against operation.

11. In an initiating recorder, key operated means for controlling the operation of said recorder, recording instrumentalities in said recorder comprising platen means and typing means, means for effecting relative case shifting movement between said platen means and said typing means, spacing mechanism for effecting relative character-spacing movement between said platen means and said typing means, code marking means, strip moving means in said code marking means, a common back spacing means for reversing the operation of said spacing mechanism and said strip moving means, blocking means controlled by said case shifting means, and means controlled by said blocking means to lock said key operated means against operation.

12. In an initiating recorder, transmitting means, a signal responsive selector, a printing mechanism and a perforating mechanism controlled by said selector to record characters corresponding to generated signals in one web and to perforate equivalent signals in another web, a common means operable to back space both webs substantially simultaneously preparatory to rubbing out a printed and perforated character, and means controlled by said back spacing device for preventing operation of said transmitting means.

EMILY Y. REIBER,
*Executrix under the Last Will and Testament of Albert H. Reiber, Deceased.*

REFERENCES CITED

The following references are of record in the file of this patent:

UNITED STATES PATENTS

| Number | Name | Date |
|---|---|---|
| 1,936,956 | Rothermal | Nov. 21, 1933 |
| 1,420,931 | Kleinschmidt | June 27, 1922 |
| 2,255,794 | Lake | Sept. 16, 1941 |
| 1,895,108 | Salmon | Jan. 24, 1933 |
| 2,174,731 | Dirkes | Oct. 3, 1939 |
| 1,623,748 | Pfannenstiehl | Apr. 5, 1927 |
| 1,370,669 | Potts | Mar. 8, 1921 |